(12) United States Patent
Han et al.

(10) Patent No.: US 10,047,207 B2
(45) Date of Patent: Aug. 14, 2018

(54) MICROPOROUS POLYIMIDE SPONGE AND METHOD FOR PRODUCING THE SAME

(71) Applicant: INDUSTRY-ACADEMIC COOPERATION FOUNDATION, YONSEI UNIVERSITY, Seoul (KR)

(72) Inventors: Haksoo Han, Seoul (KR); Jinuk Kwon, Gyeonggi-do (KR); Jinyoung Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 164 days.

(21) Appl. No.: 14/878,537

(22) Filed: Oct. 8, 2015

(65) Prior Publication Data

US 2016/0102184 A1    Apr. 14, 2016

(30) Foreign Application Priority Data

Oct. 10, 2014 (KR) .................. 10-2014-0136613

(51) Int. Cl.
  *C08J 9/00* (2006.01)
  *C08J 9/28* (2006.01)
  *C08G 73/10* (2006.01)

(52) U.S. Cl.
  CPC ............ *C08J 9/00* (2013.01); *C08G 73/1039* (2013.01); *C08G 73/1071* (2013.01); *C08J 9/28* (2013.01); *C08J 2201/026* (2013.01); *C08J 2205/042* (2013.01); *C08J 2379/08* (2013.01)

(58) Field of Classification Search
  CPC ........................................................ C08J 9/00
  See application file for complete search history.

(56) References Cited

U.S. PATENT DOCUMENTS

| | | | | | |
|---|---|---|---|---|---|
| 3,249,561 | A | * | 5/1966 | Hendrix | C08G 73/1007 521/128 |
| 3,351,569 | A | * | 11/1967 | Revallier | C08J 9/0066 264/53 |
| 3,520,837 | A | * | 7/1970 | Wilson | C08G 73/1007 521/118 |
| 3,528,950 | A | * | 9/1970 | Lubowitz | H01H 17/00 526/75 |
| 5,135,959 | A | * | 8/1992 | Hill | B29C 44/5618 264/51 |
| 6,057,379 | A | * | 5/2000 | Choi | C08G 73/1007 521/184 |
| 2004/0249002 | A1 | * | 12/2004 | Vazquez | C08G 18/346 521/50.5 |

* cited by examiner

*Primary Examiner* — Irina Krylova
(74) *Attorney, Agent, or Firm* — Duane Morris LLP; Gregory M. Lefkowitz; Jason M. Nolan

(57) ABSTRACT

Disclosed is a net-shaped polyimide sponge. The polyimide sponge has a stack structure of nets. Also disclosed is a method for producing a polyimide sponge. The method enables the production of a polyimide sponge in a simple manner compared to conventional methods based on wet or dry phase inversion techniques using porogens.

17 Claims, 2 Drawing Sheets

MICROPOROUS POLYIMIDE SPONGE AND METHOD FOR PRODUCING THE SAME

CROSS-REFERENCE TO RELATED APPLICATIONS

This application claims priority under 35 U.S.C. § 119 to Korean Patent Application No. 10-2014-0136613 filed on Oct. 10, 2014 in the Korean Intellectual Property Office, the disclosure of which is incorporated herein by reference in its entirety.

BACKGROUND OF THE INVENTION

1. Field of the Invention

The present invention relates to a microporous polyimide sponge and a method for producing the same.

2. Description of the Related Art

Polyimides are used in various applications due to their excellent mechanical properties and good resistance to heat and chemicals. Polyimides can find particular application as special-purpose thermal insulation materials where good heat resistances and chemical resistance are needed. Commercially available polyimide sponge films for thermal insulation are mainly used for energy saving in the chemical industry and other process industries.

Methods associated with the production of polymer sponges are based on the addition of blowing agents, the thermal decomposition of less heat resistant polymers after mixing with more heat resistant polymers, and the addition of ceramic components or porogens.

In addition to these methods based on the addition of pore-forming additives, phase inversion methods using solvents are also known. Wet phase inversion methods are commonly used to produce various polymer sponges. In many cases, wet phase inversion methods using soluble polyimides are applied to the production of polymer films.

On the other hand, a dry phase inversion technique reported by Echiog, et al is also applied to the production of sponge structures from general polyimides whose polyimide backbones are insoluble in solvents. The dry phase inversion technique is easily applicable to polymers of pyromellitic dianhydride and 4,4-oxydianiline. The polymers are, for example, high performance Kapton® (DuPont. Co.) structures. According to the dry phase inversion technique, pyromellitic dianhydride is polymerized with 4,4-oxydianiline in tetrahydrofuran/methanol to prepare a polyamic acid, the polyamic acid is cast into a film, and water is added to induce phase inversion.

SUMMARY OF THE INVENTION

The present invention is intended to provide a microporous polyimide sponge with good heat and chemical resistance and excellent thermal insulation properties. The present invention is also intended to provide a method for producing the polyimide sponge.

The present inventors have conducted a number of studies to achieve the above objects. Based on these studies, the present invention provides a polyamic acid precursor prepared by reacting one or more aromatic dianhydrides with one or more aromatic diamines in an organic polar solvent. The aromatic dianhydrides, the aromatic diamines, and the organic polar solvent include materials whose structures are shown below.

Specifically, the present invention provides a polyamic acid precursor, a high functional microporous polyimide sponge produced using the polyamic acid precursor, and a method for producing the polyimide sponge.

The high functional microporous polyimide sponge of the present invention has a stack structure of microporous nets. Due to this structure, the polyimide sponge of the present invention has improved chemical resistance and can be produced in a simple and economical manner without using any additional chemical compared to existing sponges.

In addition, the method of the present invention enables the production of a microporous polyimide sponge using a simple system at low cost compared to conventional methods for producing polyimide sponges based on wet or dry phase inversion techniques using porogens. The present invention reports the first method for producing a polyimide sponge in which microporous nets are stacked. The polyimide sponge produced by the method of the present invention can be applied to thermal insulation materials, drug delivery media, catalyst supports, etc. due to its good chemical stability and excellent thermal insulation and adsorption-desorption properties compared to existing PE, PP, and urethane sponges.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
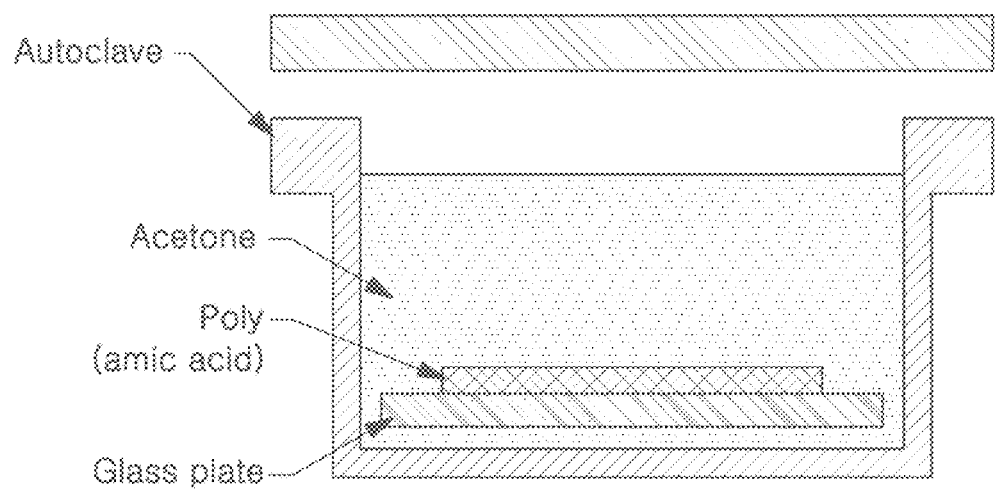
FIG. 1 is a conceptual diagram schematically showing a method for producing a polyimide sponge according to one embodiment of the present invention.

Several aspects and various embodiments of the present invention will now be described in more detail.

One aspect of the present invention is directed to a method for producing a polyimide sponge, including (B) heating a closed reactor in which a substrate surface coated with a polyamic acid solution is immersed in a liquid medium. Specifically, according to the method of the present invention, a polyimide sponge is produced by immersing a substrate coated with a polyamic acid solution in a liquid medium in a closed reactor and raising the temperature of the closed reactor under pressure.

The polyamic acid solution refers to a state in which a polyamic acid is dissolved in a solvent and the solvent remains completely unremoved. The polyamic acid solution is intended to include gel states similar to the so-called jelly and is not necessarily limited to a fluidic solution.

The polyamic acid has a structure of Formula 1:
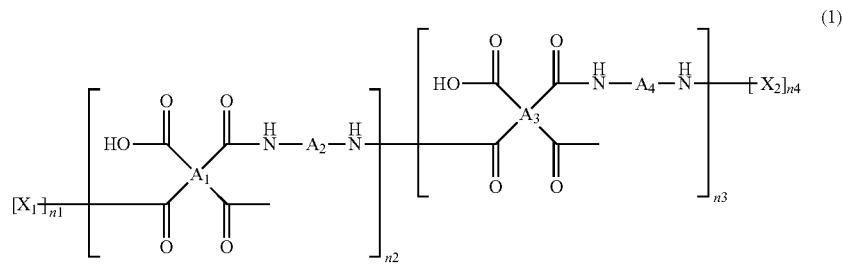
wherein
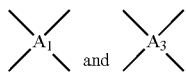
are the same as or different from each other and each independently have one of the structures of Formulae 3a to 3f:
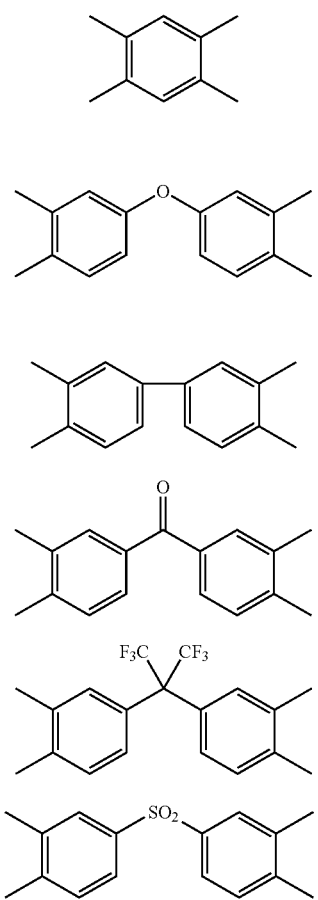
-A$_2$- and -A$_4$- are the same as or different from each other and each independently have one of the structures of Formulae 4a to 4j:
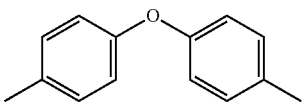
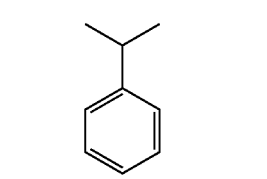
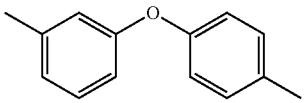
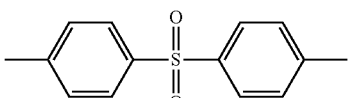
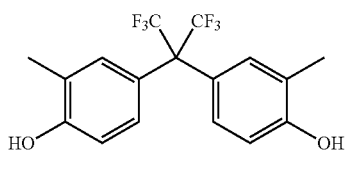
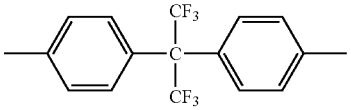
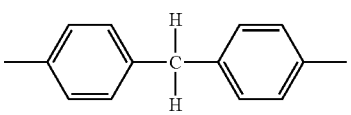
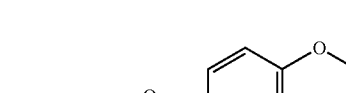
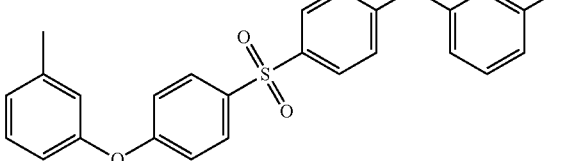

-continued (4j)
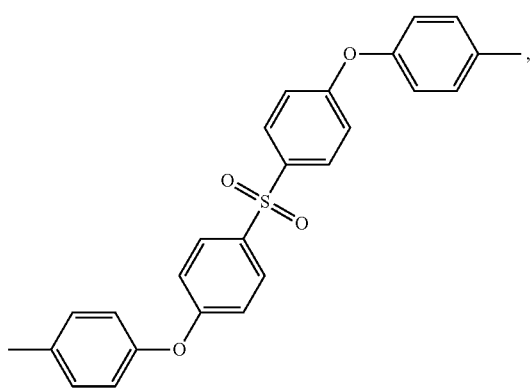

—X$_1$ and —X$_2$ are the same as or different from each other and each independently have one of the structures of Formulae 5a to 5d:

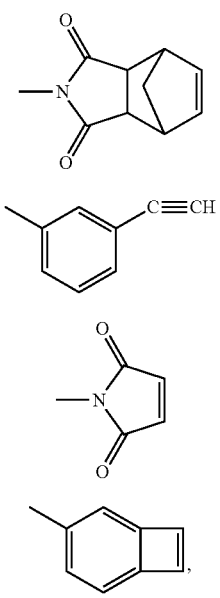

(5a)

(5b)

(5c)

(5d)

and both n1 and n4 are 0 or 1. That is, the polyamic acid may optionally include end-capping groups at both termini thereof. When the polyamic acid is end-capped, both n1 and n2 are 1. When the polyamic acid is not end-capped, both n1 and n4 are 0 (zero).

Unlike the non-end-capped polyimide sponge, the end-capped polyimide sponge undergoes polymerization during the subsequent curing to form a network structure, thus being suitable for use in the manufacture of composite materials, such as inorganic fibers. Particularly, when conventional hybrid products are manufactured by impregnating highly viscous polymer solutions into dense glass fibers, carbon fibers, etc., the use of additional facilities, such as vacuum apparatuses and presses, is required. In contrast, according to the method of the present invention, the low molecular weight resin can easily penetrate a fiber in the end-capping step and the resin molecules are crosslinked to each other while surrounding the fiber during the subsequent thermal curing. Therefore, the method of the present invention is advantageous for the manufacture of hybrid products in a more efficient manner.

In Formula 1, n2 and n3 are the same as or different from each other and are each independently an integer from 0 to 10,000, with the proviso that at least one of n2 and n3 is not zero. One or more dianhydrides and one or more diamines may be used as monomers of the polyamic acid. When only one dianhydride is used, A$_1$ and A$_3$ in Formula 1 are the same. When only one diamine is used, A$_2$ and A$_4$ in Formula 1 are the same. When only one dianhydride and one diamine are used, A$_1$ and A$_3$ are the same and A$_2$ and A$_4$ are the same.

According to one embodiment, the closed reactor is an autoclave.

According to a further embodiment, the liquid medium may be selected from acetone, ethyl acetate, and a mixture thereof. Preferably, the liquid medium is a mixed solvent of acetone and ethyl acetate in a 1:0.5-2 volume ratio. Particularly, the use of the mixed solvent enables the production of a polyimide sponge with excellent thermal properties and mechanical properties, compared to the use of only one of the above-described solvents.

According to another embodiment of the present invention, the reactor is heated to 200 to 350° C. According to another embodiment of the present invention, the reactor is heated at a rate of 1 to 50° C./minute.

According to a preferred embodiment, the heating is performed stepwise at 70 to 90° C. for 45 to 75 minutes, at 130 to 170° C. for 20 to 40 minutes, at 180 to 220° C. for 20 to 40 minutes, at 230 to 250° C. for 20 to 40 minutes, and at 320 to 380° C. for 100 to 140 minutes. Particularly, this temperature profile enables the production of a sponge with improved thermal properties, especially markedly improved mechanical properties, compared to heating at a constant rate.

According to another embodiment of the present invention, the method of the present invention may further include, prior to step (B), (A) polymerizing one or two dianhydrides with one or more diamines to obtain the polyamic acid solution. As described above, the polyamic acid solution thus obtained is immersed in the liquid medium in the closed reactor, followed by heating under pressure to produce a polyimide sponge.

The polyamic acid has a structure of Formula 1a:

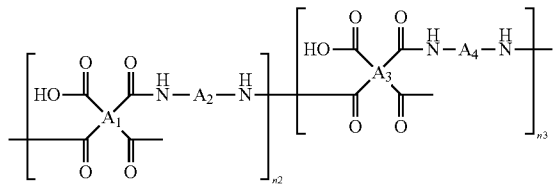

(1a)

wherein

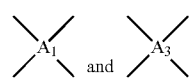

are the same as or different from each other and each independently have one of the structures of Formulae 3a to 3f, -A$_2$- and -A$_4$- are the same as or different from each other and each independently have one of the structures of Formulae 4a to 4j, and n2 and n3 are the same as or different from each other and are each independently an integer of 0 to 10,000, with the proviso that at least one of n2 and n3 is not zero.

According to another embodiment of the present invention, the ratio of n2 to n3 (n2:n3) is from 1:20 to 20:1.

According to another embodiment of the present invention, the method of the present invention may further include, prior to step (B), (A') reacting one or more dianhydrides with one or more diamines and (A") adding one or more end-capping agents to the reaction product solution to end-cap the reaction product solution.

Thereafter, the end-capped polyamic acid solution may be immersed in the liquid medium in the closed reactor, followed by heating under pressure to produce an end-capped polyimide sponge, as described above. It is advantageous to carry out step (A") after the reaction is allowed to sufficiently proceed in step (A') in that stopping of the polymerization into the polyamic acid by the end-capping agents can be avoided.

The end-capped sponge has greatly improved thermal properties compared to the non-end-capped sponge. For example, the end-capped sponge has a higher glass transition temperature by 100° C. than the non-end-capped sponge, as measured by DSC. In addition, the end-capped sponge has significantly improved mechanical properties and processability compared to the non-end-capped sponge. In conclusion, the end-capped sponge has a more advantageous structure than the non-end-capped sponge.

The polyamic acid has a structure of Formula 1:

According to another embodiment of the present invention, both n1 and n4 are 1. The ratio of n1 to n2 (n1:n2) is from 1:1 to 1:20, the ratio of n1 to n3 (n1:n3) is from 1:1 to 1:20, and the ratio of n2 to n3 (n2:n3) is from 1:20 to 20:1.

The ratio (n2+n3):n1 may be from 1:20 to 20:1. If (n2+n3)/n1 is lower than 1, a polyimide sponge with desired levels of mechanical or chemical properties is difficult to obtain. Meanwhile, if (n2+n3)/n1 exceeds 20, crosslinking by the end-capping functional groups does not substantially occur, making it difficult to obtain a polyimide sponge with desired levels of mechanical or chemical properties.

According to another embodiment of the present invention, the ratio n1:(n2+n3):n4 is 1:1-20:1. If (n2+n3)/n1 is lower than 1, a polyimide sponge with desired levels of mechanical or chemical properties is difficult to obtain. Meanwhile, if (n2+n3)/n1 exceeds 20, crosslinking by the end-capping functional groups does not substantially occur, making it difficult to obtain a polyimide sponge with desired levels of mechanical or chemical properties.

According to another embodiment of the present invention, step (B) may include (B') imidizing the polyamic acid and (B") crosslinking the X$_1$ and X$_2$ sites.

According to another embodiment of the present invention, the one or more dianhydrides are selected from pyromellitic dianhydride (PMDA), 4,4'-oxydiphthalic dianhydride (ODPA), 3,3',4,4'-biphenyltetracarboxylic dianhydride (BPDA), 3,3'4,4'-benzophenonetetracarboxylic dianhydride (BTDA), 4,4'-(hexafluoroisopropylidene)diphthalic dianhydride (6FDA), and 3,3',4,4'-diphenylsulfone tetracarboxylic dianhydride (DSDA).

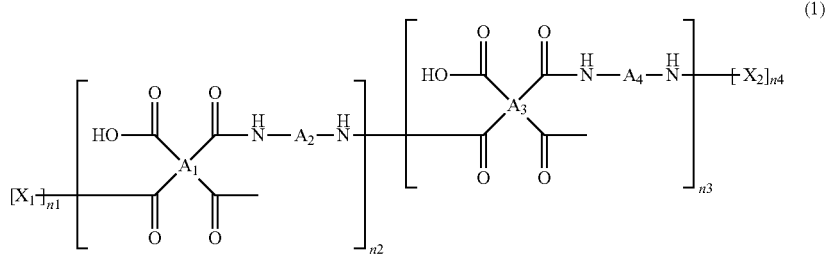

(1)

wherein

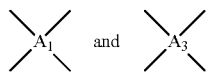

are the same as or different from each other and each independently have one of the structures of Formulae 3a to 3f, -A$_2$- and -A$_4$- are the same as or different from each other and each independently have one of the structures of Formulae 4a to 4j, —X$_1$ and —X$_2$ are the same as or different from each other and each independently have one of the structures of Formulae 5a to 5d, both n1 and n4 are 1, and n2 and n3 are the same as or different from each other and are each independently an integer from 0 to 10,000, with the proviso that at least one of n2 and n3 is not zero.

According to another embodiment of the present invention, the one or more diamines are selected from 4,4'-oxydianiline (4,4'-ODA), phenylmethyldiamine, 3,4'-oxydianiline (3,4'-ODA), 1,4-phenylenediamine (1,4-PDA), 4,4'-sulfonyldianiline (4,4'-DDS), 2,2'-bis(3-amino-4-hydroxyphenyl)hexafluoropropane (AHHFP), 2,2'-bis(4-aminophenyl)hexafluoropropane (BAPFP), 4,4'-diaminodiphenylmethane (MDA), bis(4-aminophenyl) sulfone (BAPS), bis[4-(4-aminophenoxy)phenyl]sulfone, and bis[4-(3-aminophenoxy)phenyl]sulfone.

According to another embodiment of the present invention, the one or more end-capping agents are selected from monomethyl 5-norbornene-2,3-dicarboxylate, dimethyl 5-norbornene-2,3-dicarboxylate, cis-5-norbornene-endo-2,3-dicarboxylic acid, cis-norbornene-endo-2,3-dicarboxylic anhydride, cis-norbornene-exo-2,3-dicarboxylic anhydride, 3-aminophenylacetylene, maleic anhydride, and 3-aminophenylcyclobutene, which are represented by Formulae 7a to 7h, respectively:

(7a) 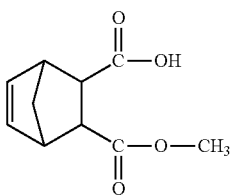

(7b) 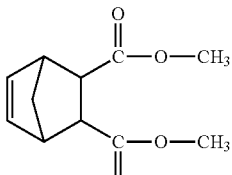

(7c) 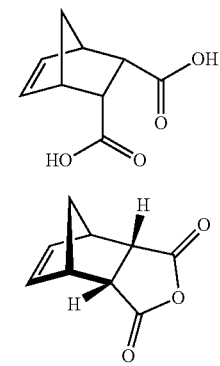

(7d)

(7e) 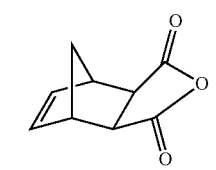

(7f) 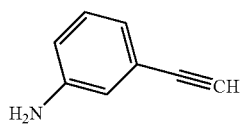

(7g) 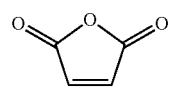

(7h) 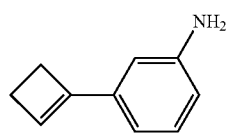

End-capping with each of the compounds of Formulae 7a to 7e forms the structure of Formula 5a. End-capping with the compounds of Formulae 7f to 7h form the structures of Formulae 5b to 5d, respectively.

According to another embodiment of the present invention, the content of the polyamic acid in the polyamic acid solution is from 5 to 50% by weight, based on the total weight of the solution. If the polyamic acid content is outside the range defined above, i.e. it is less than 5% by weight or exceeds 50% by weight, the resulting sponge has a low degree of pore size uniformity, and as a result, its ability to capture drugs is limited when used later in drug delivery systems and other applications.

According to another embodiment of the present invention, the polyamic acid solution may further include a filler. The filler may be selected from silica, clay, zirconium, and mixtures thereof. The filler may be included in an amount of 0.01 to 10 parts by weight, based on 100 parts by weight of the polyamic acid solution.

According to another embodiment of the present invention, the filler is added in step (A) or (A'). It is preferred to add the filler after either the dianhydrides or the diamines are dissolved and before the other monomers are added. For example, the filler may be added after dissolution of the dianhydrides and before addition of the diamines. Alternatively, the filler may be added after dissolution of the diamines and before addition of the dianhydrides. The order of addition of the filler ensures further improved thermal properties and mechanical properties of a sponge.

A further aspect of the present invention is directed to a polyimide sponge having a structure of Formula 2:

(2)

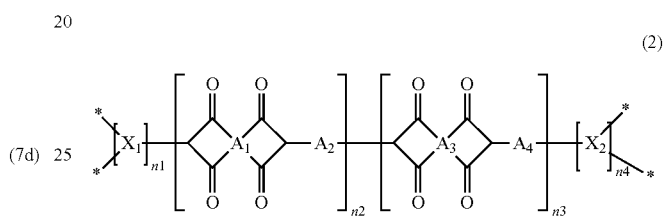

wherein

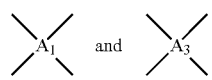 and 

are the same as or different from each other and each independently have one of the structures of Formulae 3a to 3f:

(3a) 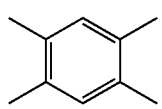

(3b) 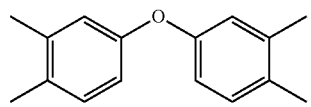

(3c) 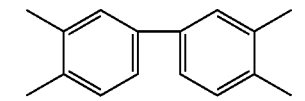

(3d) 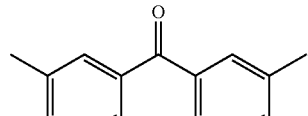

(3e) 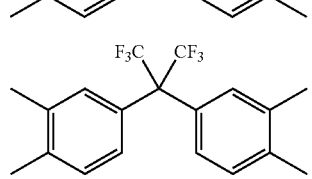

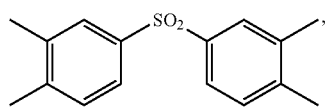 (3f)

-A$_2$- and -A$_4$- are the same as or different from each other and each independently have one of the structures of Formulae 4a to 4j:

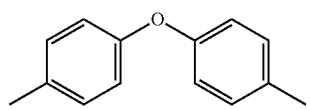 (4a)

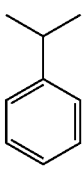 (4b)

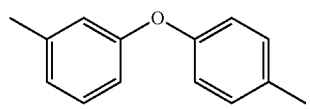 (4c)

 (4d)

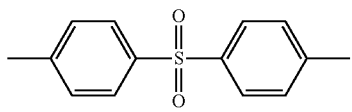 (4e)

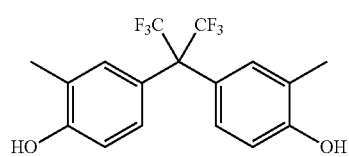 (4f)

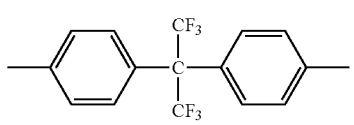 (4g)

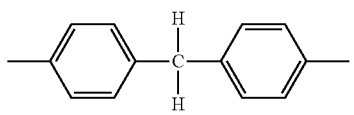 (4h)

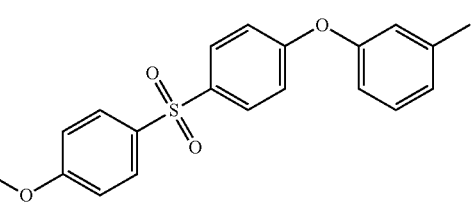 (4i)

 (4j)

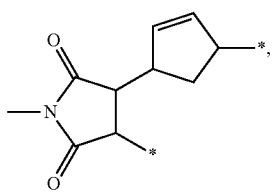

are the same as or different from each other and each independently have the structure of Formula 6:

(6)

both n1 and n4 are 0 or 1, and n2 and n3 are the same as or different from each other and are each independently an integer from 0 to 10,000, with the proviso that at least one of n2 and n3 is not zero.

According to another embodiment of the present invention, both n1 and n4 in Formula 2 are 1. The polyimide sponge whose both ends are capped has the following structural and physical properties: a porosity of 70 to 90%, as measured by the BET method and the mercury intrusion method, a specific surface area of 95 to 110 m$^2$/g, as measured by the nitrogen BET method, a pore size of 2 to 100 nm, as measured by the BJH method, a peak at 2 to 7 nm in the pore size distribution curve obtained by the BJH method, a pore size of 4 to 100 nm, as measured by the mercury intrusion method, a peak at 10 to 20 nm in the pore size distribution curve obtained by the mercury intrusion method, a 1% decomposition temperature of 500 to 515° C., as measured by TGA analysis, a 10% decomposition temperature of 560 to 570° C., as measured by TGA analysis, and a glass transition temperature of 430 to 450° C., as measured by DSC analysis.

According to another embodiment of the present invention, the polyimide sponge is produced in accordance with the embodiments of the present invention.

According to another embodiment of the present invention, the polyimide sponge has a structure in which both ends are not capped, represented by Formula 2a:

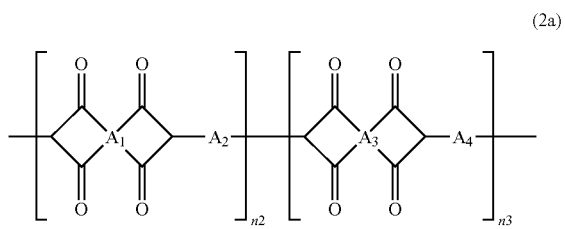

wherein

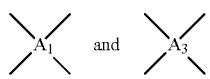

are the same as or different from each other and each independently have one of the structures of Formulae 3a to 3f, -$A_2$- and -$A_4$- are the same as or different from each other and each independently have one of the structures of Formulae 4a to 4j, and n2 and n3 are the same as or different from each other and are each independently an integer of 0 to 10,000, with the proviso that at least one of n2 and n3 is not zero.

According to another embodiment of the present invention, the non-end-capped polyimide sponge has the following structural and physical properties: a porosity of 70 to 90%, as measured by the BET method and the mercury intrusion method, a specific surface area of 95 to 110 m²/g, as measured by the nitrogen BET method, a pore size of 2 to 100 nm, as measured by the BJH method, a peak at 2 to 7 nm in the pore size distribution curve obtained by the BJH method, a pore size of 4 to 100 nm, as measured by the mercury intrusion method, a peak at 10 to 20 nm in the pore size distribution curve obtained by the mercury intrusion method, a 1% decomposition temperature of 500 to 515° C., as measured by TGA analysis, a 10% decomposition temperature of 560 to 570° C., as measured by TGA analysis, and a glass transition temperature of 320 to 340° C., as measured by DSC analysis.

Below is a more detailed description of the present invention.

It is preferred to allow an aromatic dianhydride to react with an aromatic diamine in the same molar proportions. The aromatic dianhydride and the aromatic diamine are the same as those mentioned above. First, the dianhydride reacts with the amine groups of the diamine at both terminal rings thereof to prepare a polyamic acid precursor in the form of a solution, as depicted in Reaction 1:

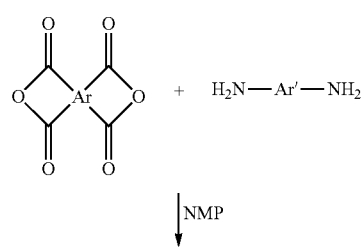

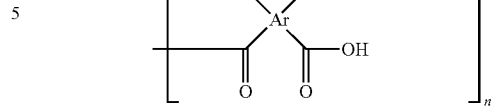

Thereafter, the polyamic acid is subjected to imidization. As a result of the imidization, the polyamic acid is dehydrated and condensed to form a polyimide resin, as depicted in Reaction 2.

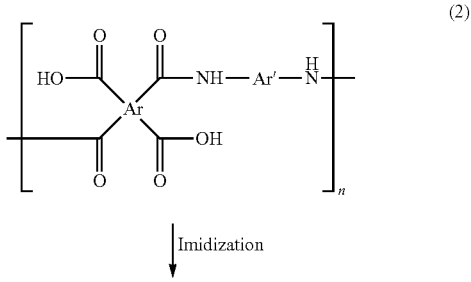

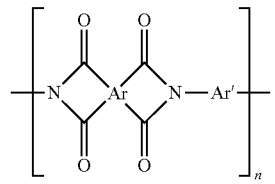

According to a specific embodiment, the polyimide sponge is produced by filling a closed reactor, such as an autoclave, with acetone, coating glass with the polyamic acid precursor, immersing the coated glass in the acetone, and raising the temperature of the reactor to about 250 to about 350° C., as shown in FIG. 1. The polyimide sponge has a stack structure of microporous nets.

The present invention will be explained in more detail with reference to the following examples. However, these examples are not to be construed as limiting or restricting the scope and disclosure of the invention. It is to be understood that based on the teachings of the present invention including the following examples, those skilled in the art can readily practice other embodiments of the present invention whose experimental results are not explicitly presented. It will also be understood that such modifications and variations are intended to come within the scope of the appended claims.

EXAMPLES

Preparative Example 1: Preparation of Polyamic Acid Precursor

A polyamic acid precursor was synthesized according to the following schematic reaction 3:

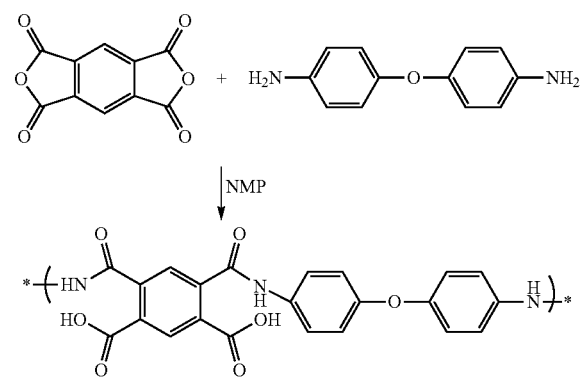

(3)

First, 500 mL of 0.801 g (3 mmol) of 4,4'-oxydianiline was added to a 500 mL Erlenmeyer flask and 10 mL of NMP as a polar solvent was added thereto. The mixture was stirred to achieve complete dissolution. Then, to the solution was added pyromellitic dianhydride (0.873 g, 3 mmol) in the same number of moles as that of the 4,4'-oxydianiline. The resulting mixture was stirred under a nitrogen atmosphere at 0° C. for 24 h.

Example 1: Production of Microporous Polyimide Sponge in which Microporous Nets were Stacked A polyimide sponge was produced using the polyamic acid precursor prepared in Preparative Example 1 according to the following schematic reaction 4:

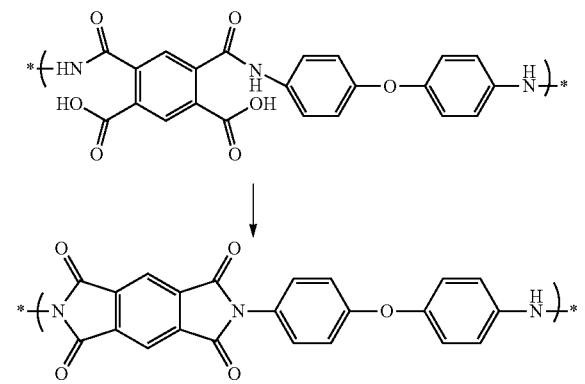

(4)

The polyamic acid precursor prepared in Preparative Example 1 was coated on glass, introduced into an autoclave filled with acetone, and cured stepwise at 80° C. for 1 h, at 150° C. for 30 min, at 200° C. for 30 min, and at 350° C. for 2 h in the oven, affording a sponge in which microporous nets were stacked. Finally, the microporous sponge was dried in a vacuum oven at 80° C. for 24 h.

Test Example 1: Thermogravimetric Analysis

Figure 2:
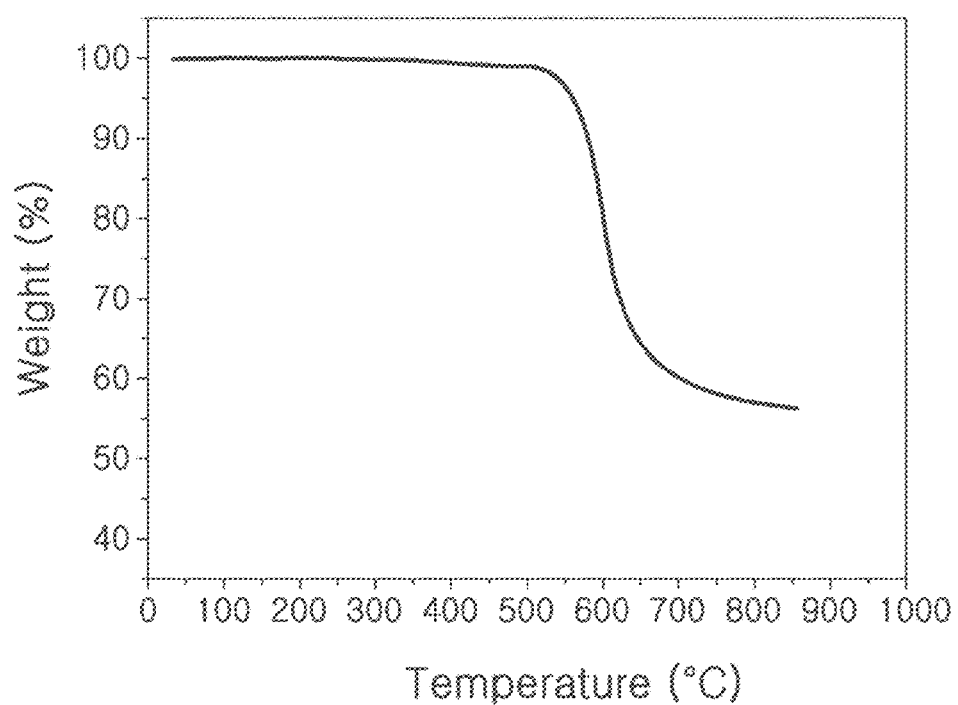
FIG. 2 shows the results of thermogravimetric analysis for a polyimide sponge according to one embodiment of the present invention.
Figure 3:
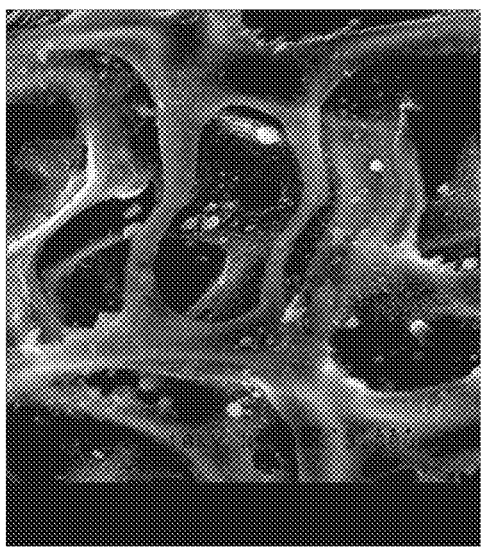
FIG. 3 is a SEM image showing the surface of a polyimide sponge according to one embodiment of the present invention.

Thermogravimetric analysis was performed to evaluate the thermal stability of the high functional polyimide sponge produced in Example 1. Specifically, changes in the weight of the polyimide sponge were measured while heating from room temperature to 800° C. The results are shown in FIG. 2. From the results, it was confirmed that the sponge was highly thermally stable even at high temperatures. The 1% and 5% weight loss temperatures of the sponge were 520° C. and 580° C., respectively, revealing very high thermal stability of the sponge.

Test Example 2: Thermal Conductivity Measurement

The thermal conductivity of the high functional polyimide sponge produced in Example 1 was measured using a thermal conductivity meter. As a result, the polyimide sponge had a thermal conductivity of 0.054 W/m·K, demonstrating its excellent thermal insulation properties.

What is claimed is:
1. A method for producing a polyimide sponge, comprising
   (B) heating a closed reactor in which a substrate surface coated with a polyamic acid solution is immersed in a liquid medium,
   wherein the polyamic acid has a structure of Formula 1:

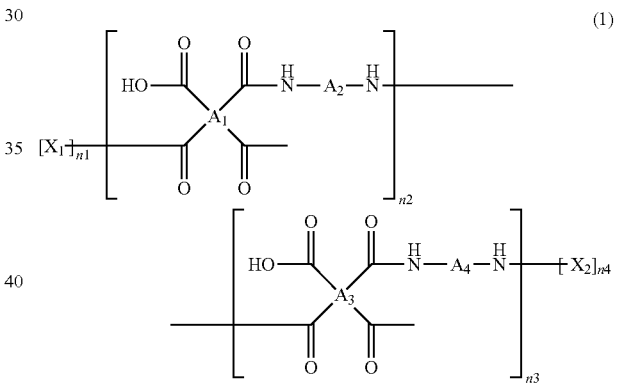

(1)

wherein

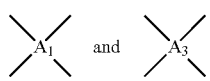

are the same as or different from each other and each independently have one of the structures of Formulae 3a to 3f:

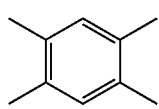

(3a)

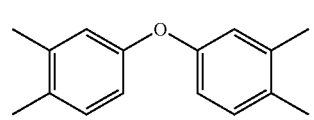

(3b)

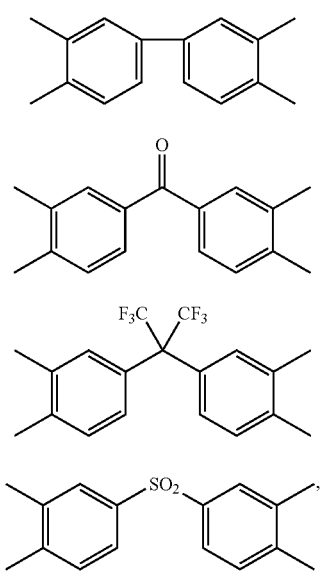

-A$_2$- and -A$_4$- are the same as or different from each other and each independently have one of the structures of Formulae 4a to 4j:

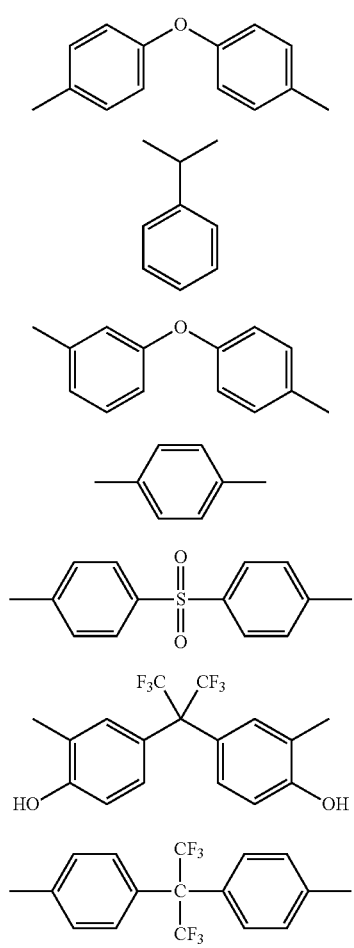

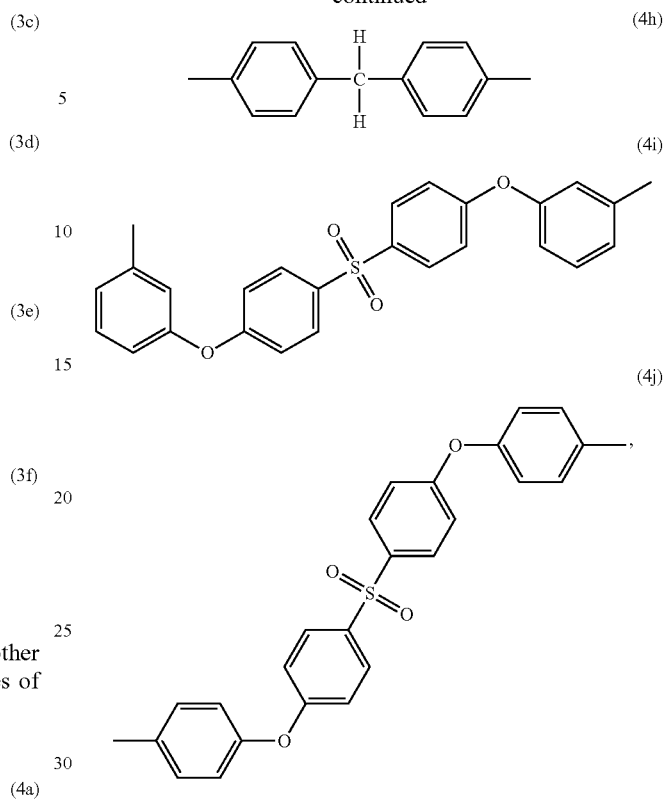

—X$_1$ and —X$_2$ are the same as or different from each other and each independently have one of the structures of Formulae 5a to 5d:

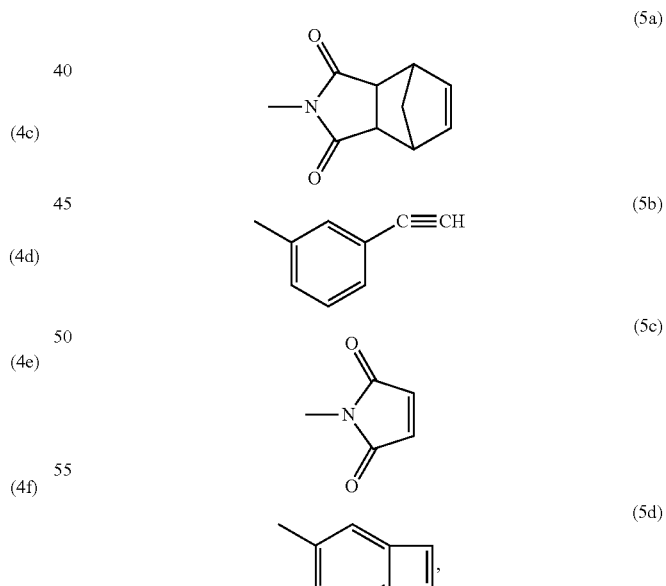

both n1 and n4 are 0 or 1, and n2 and n3 are the same as or different from each other and are each independently an integer from 0 to 10,000, with the proviso that at least one of n2 and n3 is not zero, wherein the liquid medium is a mixed solvent of acetone and ethyl acetate in a 1:0.5-2 volume ratio,
wherein the polyamic acid in the polyamic acid solution comprises from 5 to 50% by weight, based on the total weight of the solution, and
wherein the closed reactor is heated stepwise according to a temperature profile comprising 70 to 90° C. for 45 to 75 minutes, at 130 to 170° C. for 20 to 40 minutes, at 180 to 220° C. for 20 to 40 minutes, at 230 to 250° C. for 20 to 40 minutes, and at 320 to 380° C. for 100 to 140 minutes.

2. The method according to claim 1, wherein the ratio of n2 to n3 (n2:n3) is from 1:20 to 20:1.

3. The method according to claim 1, wherein both n1 and n4 are 1, the ratio of n1 to n2 (n1:n2) is from 1:1 to 1:20, the ratio of n1 to n3 (n1:n3) is from 1:1 to 1:20, the ratio of n2 to n3 (n2:n3) is from 1:20 to 20:1, and the ratio (n2+n3):n1 is from 1:20 to 20:1.

4. The method according to claim 1, wherein the ratio n1:(n2+n3):n4 is 1:1-20:1.

5. The method according to claim 1, wherein the step (B) further comprises (B') imidizing the polyamic acid and (B") crosslinking the $X_1$ and $X_2$ sites.

6. The method according to claim 1, wherein the polyamic acid solution further comprises at least one filler selected from the group consisting of silica, clay, and zirconium, and
wherein the filler is present in an amount of 0.01 to 10 parts by weight, based on 100 parts by weight of the polyamic acid solution.

7. The method according to claim 6, wherein the filler is added to a precursor of the polyamic acid solution prior to step (B).

8. The method according to claim 1, wherein the polyimide sponge comprises a stack of microporous nets.

9. A method for producing a polyimide sponge, comprising
(A) polymerizing one or two dianhydrides with one or more diamines to obtain a polyamic acid solution and
(B) heating a closed reactor in which a substrate surface coated with the polyamic acid solution is immersed in a liquid medium,
wherein the polyamic acid has a structure of Formula 1:

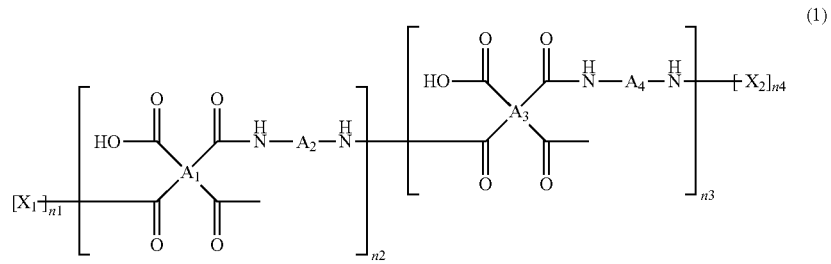

(1)

wherein

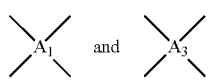

are the same as or different from each other and each independently have one of the structures of Formulae 3a to 3f:

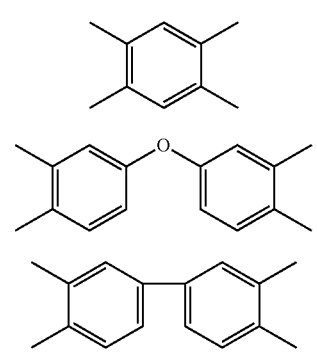

(3a)

(3b)

(3c)

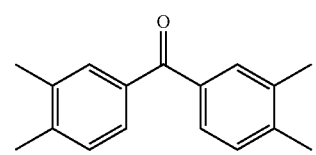

(3d)

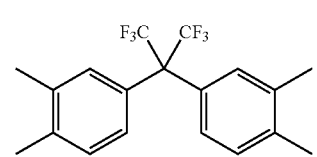

(3e)

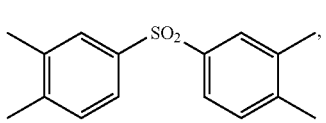

(3f)

-$A_2$- and -$A_4$- are the same as or different from each other and each independently have one of the structures of Formulae 4a to 4j:

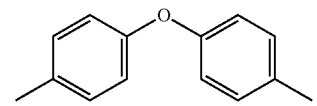

(4a)

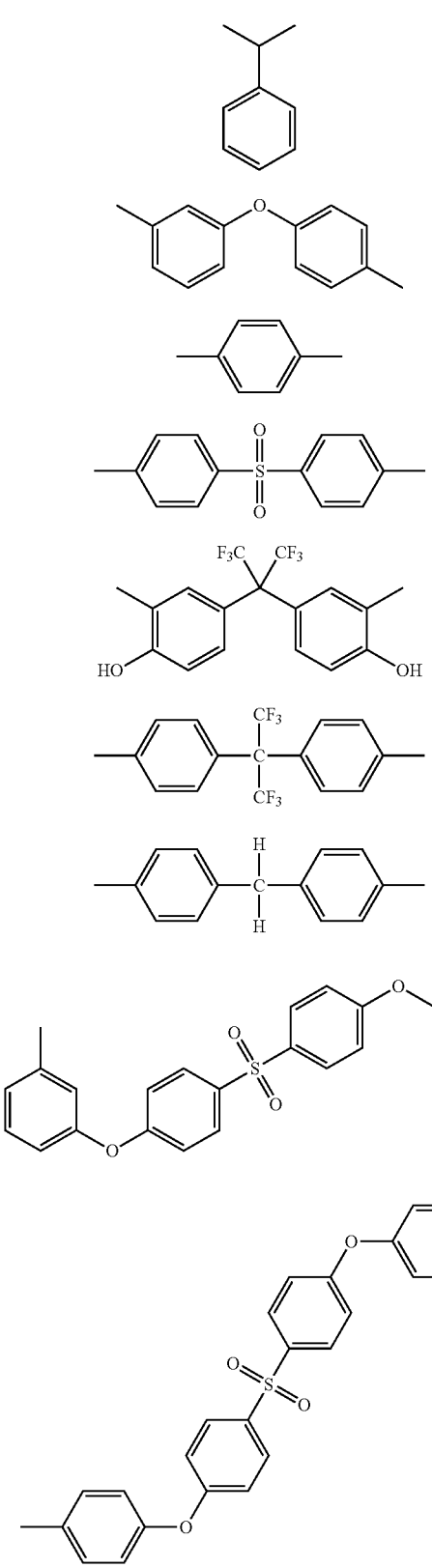

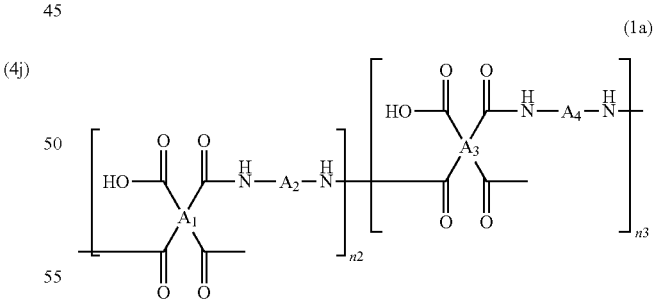

both n1 and n4 are 0 or 1, and
n2 and n3 are the same as or different from each other and are each independently an integer from 0 to 10,000, with the proviso that at least one of n2 and n3 is not zero, wherein the liquid medium is a mixed solvent of acetone and ethyl acetate in a 1:0.5-2 volume ratio, wherein the polyamic acid in the polyamic acid solution comprises from 5 to 50% by weight, based on the total weight of the solution, and wherein the closed reactor is heated stepwise according to a temperature profile comprising 70 to 90° C. for 45 to 75 minutes, at 130 to 170° C. for 20 to 40 minutes, at 180 to 220° C. for 20 to 40 minutes, at 230 to 250° C. for 20 to 40 minutes, and at 320 to 380° C. for 100 to 140 minutes.

10. The method according to claim 9, wherein the polyamic acid has a structure of Formula 1a:

wherein

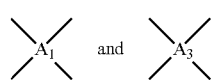

—$X_1$ and —$X_2$ are the same as or different from each other and each independently have one of the structures of Formulae 5a to 5d:

are the same as or different from each other and each independently have one of the structures of Formulae 3a to 3f, -A$_2$- and -A$_4$- are the same as or different from each other and each independently have one of the structures of Formulae 4a to 4j, and n2 and n3 are the same as or different from each other and are each independently an integer of 0 to 10,000, with the proviso that at least one of n2 and n3 is not zero.

11. The method according to claim 10, wherein the one or more dianhydrides are pyromellitic dianhydride (PMDA), 4,4'-oxydiphthalic dianhydride (ODPA), 3,3',4,4'-biphenyltetracarboxylic dianhydride (BPDA), 3,3'4,4'-benzophenonetetracarboxylic dianhydride (BTDA), 4,4'-(hexafluoroisopropylidene)diphthalic dianhydride (6FDA), or 3,3',4,4'-diphenylsulfone tetracarboxylic dianhydride (DSDA).

12. The method according to claim 10, wherein the one or more diamines are 4,4'-oxydianiline (4,4'-ODA), phenylmethyldiamine, 3,4'-oxydianiline (3,4'-ODA), 1,4-phenylenediamine (1,4-PDA), 4,4'-sulfonyldianiline (4,4'-DDS), 2,2'-bis(3-amino-4-hydroxyphenyl)hexafluoropropane (AHHFP), 2,2'-bis(4-aminophenyl)hexafluoropropane (BAPFP), 4,4'-diaminodiphenylmethane (MDA), bis(4-aminophenyl)sulfone (BAPS), bis[4-(4-aminophenoxy)phenyl]sulfone, or bis[4-(3-aminophenoxy)phenyl]sulfone.

13. The method according to claim 9, wherein the polyimide sponge comprises a stack of microporous nets.

14. A method for producing a polyimide sponge, comprising
(A') reacting one or more dianhydrides with one or more diamines to obtain a polyamic acid solution,
(A") adding one or more end-capping agents to the polyamic acid solution to end-cap the polyamic acid solution, and
(B) heating a closed reactor in which a substrate surface coated with the end-capped polyamic acid solution is immersed in a liquid medium wherein the polyamic acid has a structure of Formula 1:

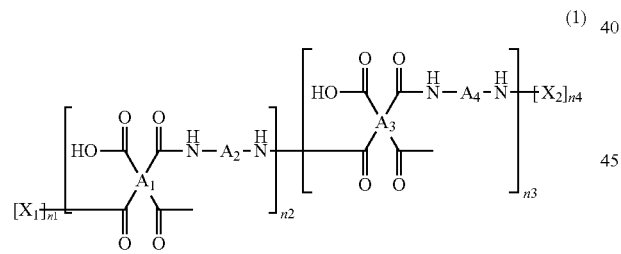
(1)

wherein

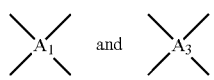

are the same as or different from each other and each independently have one of the structures of Formulae 3a to 3f:

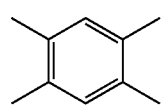
(3a)

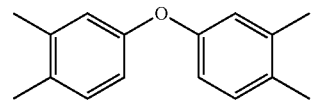
(3b)

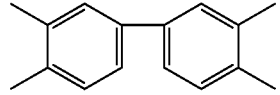
(3c)

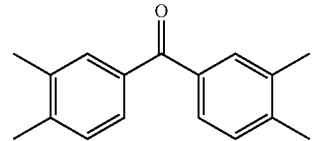
(3d)

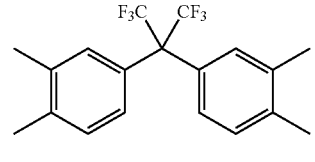
(3e)

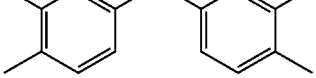
(3f)

-A$_2$- and -A$_4$- are the same as or different from each other and each independently have one of the structures of Formulae 4a to 4j:

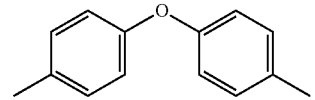
(4a)

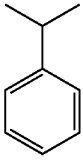
(4b)

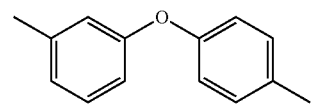
(4c)

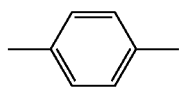
(4d)

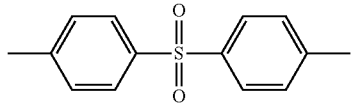
(4e)

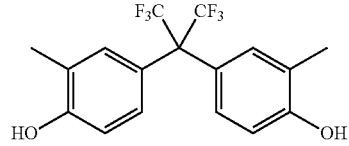
(4f)

-continued

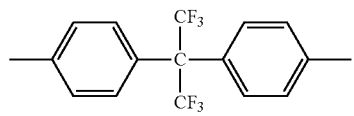 (4g)

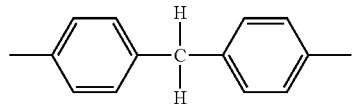 (4h)

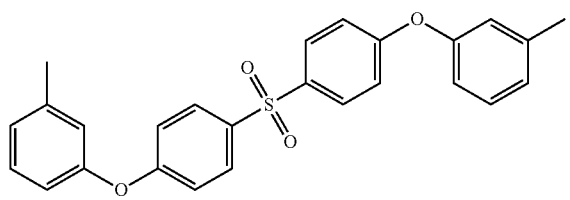 (4i)

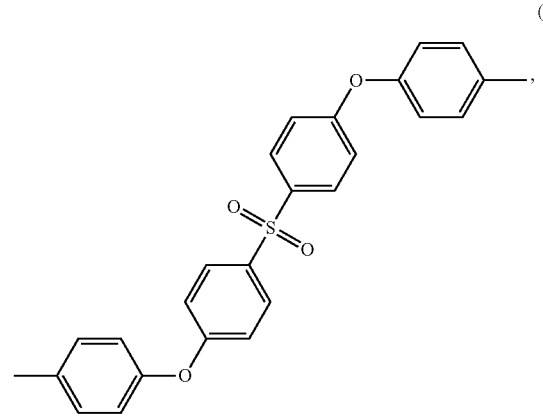 (4j)

—X$_1$ and —X$_2$ are the same as or different from each other and each independently have one of the structures of Formulae 5a to 5d:

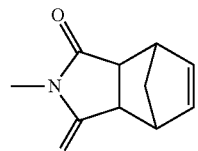 (5a)

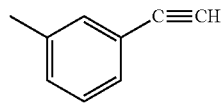 (5b)

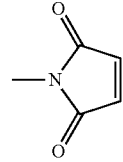 (5c)

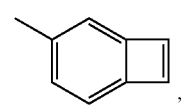 (5d)

both n1 and n4 are 0 or 1, and n2 and n3 are the same as or different from each other and are each independently an integer from 0 to 10,000, with the proviso that at least one of n2 and n3 is not zero, wherein the liquid medium is a mixed solvent of acetone and ethyl acetate in a 1:0.5-2 volume ratio, wherein the polyamic acid in the polyamic acid solution comprises from 5 to 50% by weight, based on the total weight of the solution, and wherein the closed reactor is heated stepwise according to a temperature profile comprising 70 to 90° C. for 45 to 75 minutes, at 130 to 170° C. for 20 to 40 minutes, at 180 to 220° C. for 20 to 40 minutes, at 230 to 250° C. for 20 to 40 minutes, and at 320 to 380° C. for 100 to 140 minutes.

15. The method according to claim 14, wherein the polyamic acid has a structure of the Formula 1:

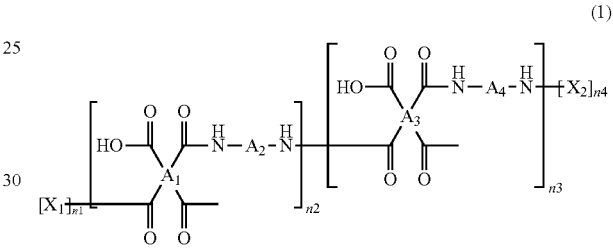 (1)

wherein

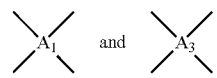

are the same as or different from each other and each independently have one of the structures of Formulae 3a to 3f, -A$_2$- and -A$_4$- are the same as or different from each other and each independently have one of the structures of Formulae 4a to 4j, —X$_1$ and —X$_2$ are the same as or different from each other and each independently have one of the structures of Formulae 5a to 5d:

both n1 and n4 are 1, and n2 and n3 are the same as or different from each other and are each independently an integer from 0 to 10,000, with the proviso that at least one of n2 and n3 is not zero.

16. The method according to claim 14, wherein the one or more end-capping agents are monomethyl 5-norbornene-2,3-dicarboxylate, dimethyl 5-norbornene-2,3-dicarboxylate, cis-5-norbornene-endo-2,3-dicarboxylic acid, cis-norbornene-endo-2,3-dicarboxylic anhydride, cis-norbornene-exo-2,3-dicarboxylic anhydride, 3-aminophenylacetylene, maleic anhydride, or 3-aminophenylcyclobutene, which are represented by Formulae 7a to 7h, respectively:

(7a)
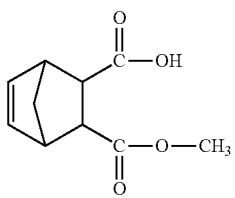
(7b)
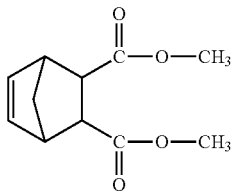
(7c)
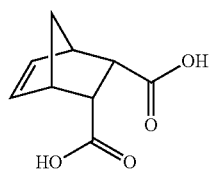
(7d)
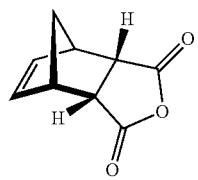
(7e)
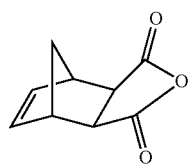
(7f)
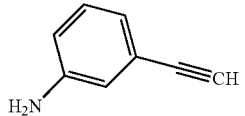
(7g)
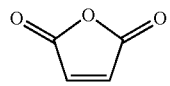
(7h)
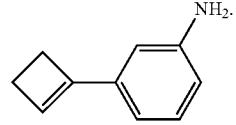
17. The method according to claim 14, wherein the polyimide sponge comprises a stack of microporous nets.
* * * * *